United States Patent [19]

Olson

[11] 4,258,688
[45] Mar. 31, 1981

[54] TIME DELAY VALVE
[75] Inventor: Donel R. Olson, Huntington Beach, Calif.
[73] Assignee: Olson Engineering, Inc., Huntington Beach, Calif.
[21] Appl. No.: 114,238
[22] Filed: Jan. 22, 1980

Related U.S. Application Data
[63] Continuation of Ser. No. 878,637, Feb. 17, 1978, Pat. No. 4,165,982.
[51] Int. Cl.³ ............................................. F02M 23/04
[52] U.S. Cl. ..................................... 123/587; 123/409
[58] Field of Search .......... 123/117 A, 124 R, 124 A, 123/124 B, 119 D, 119 DB, 146.5 A

[56] References Cited
U.S. PATENT DOCUMENTS

| 3,326,197 | 6/1967 | Elkins | 123/117 A |
|---|---|---|---|
| 3,476,094 | 11/1969 | Rucins et al. | 123/117 A |
| 3,902,469 | 9/1975 | Scott, Jr. | 123/117 A |
| 3,913,541 | 10/1975 | Scott, Jr. | 123/119 D |
| 3,949,711 | 4/1976 | Rittmansberger et al. | 123/119 DB |
| 3,978,832 | 9/1976 | Walker et al. | 123/117 A |
| 4,015,568 | 4/1977 | Horiyc et al. | 123/124 R |
| 4,083,342 | 4/1978 | Bertling | 123/124 R |
| 4,084,565 | 4/1978 | Dorsch | 123/119 DB |
| 4,117,814 | 10/1978 | Takahashi | 123/124 R |

Primary Examiner—Charles J. Myhre
Assistant Examiner—Raymond A. Nelli
Attorney, Agent, or Firm—Knobbe, Martens, Olson, Hubbard & Bear

[57] ABSTRACT

A time delay valve used in vacuum systems of internal combustion engines to significantly reduce exhaust emission pollutants. The valve includes a resilient valve disk with an orifice therethrough. An enlarged cavity is provided adjacent the valve disk into which either a spacer ring or spring may be inserted. In one mode, with the spacer ring inserted, the time delay valve regulates the change rate of both vacuum increase and vacuum decrease across the valve. In an alternative mode with the spacer ring replaced by a spring, the time delay valve regulates only the change rate of vacuum increase across the valve.

6 Claims, 5 Drawing Figures

TIME DELAY VALVE

This is a continuation of application Ser. No. 878,647, filed Feb. 17, 1978, now U.S. Pat. No. 4,165,982.

BACKGROUND OF THE INVENTION

This invention relates to a dual mode time delay valve for use in various vacuum systems designed to limit the exhaust emissions of internal combustion engines. More particularly, the invention relates to a time delay valve which can effectively reduce exhaust emissions in two distinct vacuum applications by simply inserting or removing a spacer ring from the valve.

In recent years, due to increasing environmental pollution, Federal and State legislators have adopted strict standards in regulating the exhaust emissions of vehicles. Most of this legislation has been progressive in nature wherein the emission standards become more stringent each successive year. Additionally, due to the dwindling supply of fossil fuel, legislatures as well as the general public have demanded better fuel economy from vehicles. Due to these demands, automobile manufacturers have incorporated various emission control and fuel economy systems into their vehicles. In many instances these systems have utilized a vacuum source typically produced by either small vacuum motors regulated by engine rpm or vacuum ports located at the carburetor or intake manifold of the engine to operate a variety of pollution and performance components. The most common of these control systems have affected the manner in which a vacuum source at the carburetor operates servo mechanisms which advance and retard engine timing. Other typical systems have utilized air bleed devices to provide additional air to the intake manifold as a function of engine vacuum.

These servo mechanism systems provide greater efficiency in engine operation by balancing engine timing with engine performance. During gradual acceleration or deceleration conditions, the increase in vacuum is communicated to a servo mechanism which causes a related increase in the spark advance setting of the distributor. This advance setting provides a longer burn duration of the fuel mixture which significantly increases engine efficiency during this type of engine performance. Alternatively, during rapid acceleration, the decrease in vacuum causes a corresponding decrease or retarding of the engine spark timing which is desirable for better power performance during full throttle operation.

Air bleed systems significantly reduce exhaust emissions by providing air to the intake manifold as a function of engine or carburetor throttle position. Upon gradual acceleration or deceleration conditions the increase in (ported carburetor) vacuum is communicated to the bleed system which causes additional air to be fed into the intake manifold. This additional air provides a more complete burning of the fuel at a lower combustion temperature with the resultant decrease in the formation of pollutants. Alternatively, upon rapid acceleration, the decrease in carburetor ported vacuum causes the bleed sysem to decrease the amount of air fed into the intake manifold.

Although these servo mechanisms and air bleed systems in most instances have met the fuel economy and decreased exhaust emissions demands of the past, it is evident that these systems must be significantly improved to meet future demands.

One of the major deficiencies of both the servo mechanisms and the air bleed systems is their rapid response time to changes in engine vacuum. This rapid response time, in many instances, increases the production of pollutants in the engine exhaust and degrades vehicle driveability. It has been discovered that by regulating or delaying the rate of change of vacuum to these servo mechanisms or air bleed systems, exhaust pollutants can be significantly reduced.

SUMMARY OF THE INVENTION

The present invention provides a dual mode time delay valve which can effectively regulate the vacuum change rate from a vacuum source to various vacuum components such as a spark servo mechanism or air bleed system, thereby significantly reducing exhaust pollutants.

The time delay valve is composed of a valve body, having two sections, which are registered and fastened together by snap flanges. An aperture passes through the valve body and forms an enlarged interior cavity having an annular valve seat therein. Positioned inside this enlarged cavity is a resilient disk with an orifice therethrough which cooperates with the annular seat. The enlarged cavity is designed to allow insertion of either a spacer ring to maintain the resilient disk against the valve seat, or a small spring to slightly bias the resilient disk toward the valve seat.

When the resilient disk is cooperating with the valve seat, all flow passing through the valve is regulated by the orifice, thereby delaying the application of vacuum to the system. When the resilient disk is away from the seat, free flow is achieved around the disk through the enlarged cavity and any change of vacuum is rapidly transferred throughout the system.

Therefore, in one mode, i.e., when the spacer ring is inserted into the enlarged cavity, the resilient disk is positively biased against the valve seat and the time delay valve constantly regulates any changes in vacuum. In an alternative mode, i.e., when the spacer ring is removed from the enlarged cavity and replaced by a spring, the resilient disk only intermittently cooperates with the valve seat and the time delay valve only regulates the rate of increasing vacuum, but not the rate of vacuum decrease.

It can therefore be seen that the present invention comprises an effective and versatile vacuum time delay valve which can be utilized in different vacuum applications simply by inserting a spring or alternatively a spacer ring.

These and other features of the present invention will become more apparent upon reference to the drawings wherein.

DETAILED DESCRIPTION OF THE PREFERRED EMBODIMENT

Figure 1:
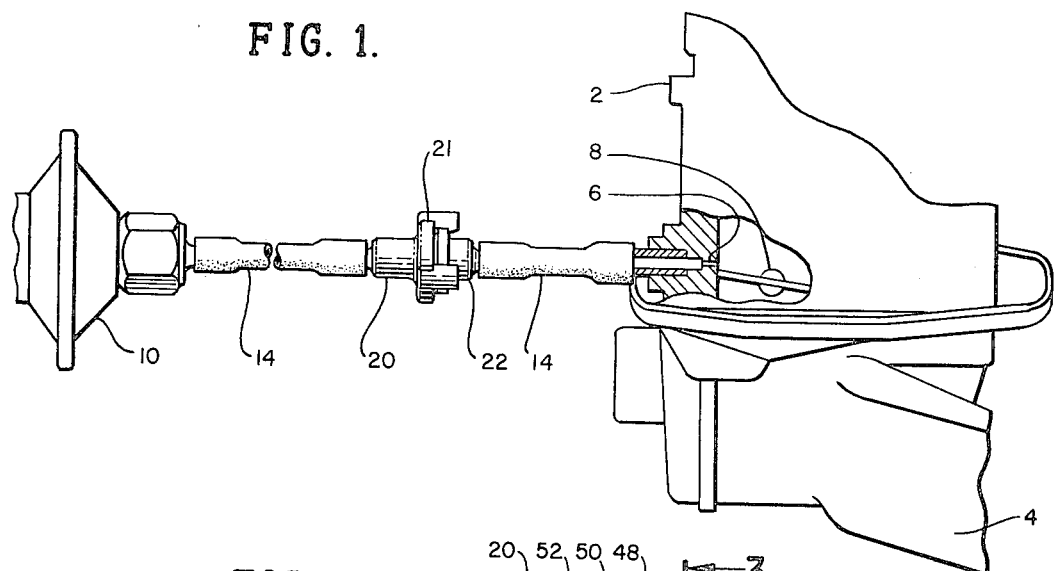
FIG. 1 is a schematic view showing the time delay valve installed in a vacuum line between a carburetor vacuum advance port and a spark distributor advance servo mechanism.

Referring to FIG. 1 there is shown a vacuum system typically used in automotive internal combustion engines. A down-draft type carburetor 2 having a throttle valve 8 pivotally mounted therein controls the flow of the fuel/air mixture into an intake manifold 4 which is mounted in a conventional manner to the engine block (not shown). A vacuum advance port 6 is provided on one wall of the carburetor 2 and is located slightly above the engine off-idle position of the throttle valve 8.

A spark advance servo mechanism 10 which is well known in the art is connected to the distributor (not shown) and is in communication with the vacuum advance port 6 through a vacuum conduit 14. Connected in series with the vacuum conduit 14 is the time delay valve 21 of the present invention which in this particular system regulates the application rate of the vacuum from the vacuum advance port 6 to the spark advance servo mechanism 10.

Figure 2:
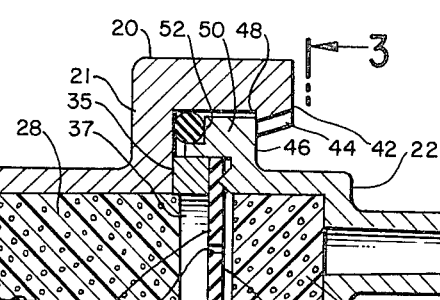
FIG. 2 is an enlarged cross-sectional view showing the internal components of the time delay valve with the spacer ring inserted into the enlarged cavity.
Figure 3:
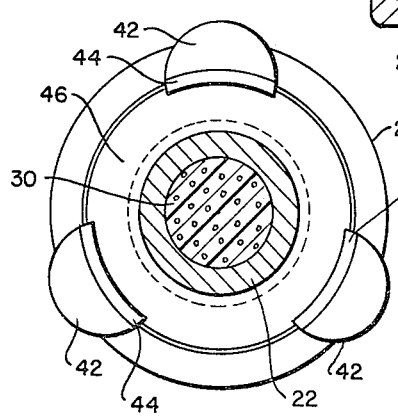
FIG. 3 is a cross-sectional view taken along line 3—3 of FIG. 3 showing the quick connect and disconnect flanges of the time delay valve.

Referring to FIG. 2, the detailed construction of the time delay valve can be seen. The time delay valve 21 is composed of two interlocking housing segments 20 and 22 having apertures therethrough and preferably molded of plastic. Symmetrically spaced and extending from the outside diameter of the housing segment 20 are three flanges 42 having inwardly sloping faces 44. These flanges 42 form an annular recess 48, the diameter of which is slightly larger than the outside diameter 49 of an annular flange 50 at the extreme end of the housing segment 22. When assembling the two housing segments 20 and 22, the outside diameter 49 of the flange 50 cams against the sloping faces 44, forcing the flanges 42 to deflect radially outward. This outward deflection of the flanges 42 allows housing segment 20 to enter the recess 48 formed by the flanges 42. When the shoulder 46 of the housing segment 22 clears the recess 48, the flanges 42 resiliently spring back to their unstressed positions and positively lock the two housing segments together. Similarly, disassembly of the housing segments may be accomplished by manually flexing the flanges 42 radially outward, and then withdrawing the housing segment 22. It can readily be seen that the flanges 42 provide a quick connect and disconnect means for the time delay valve which facilitates easy access to the internal components of the valve, as for inspection and cleaning.

The internal configuration of the valve consists of enlarged, cavity-forming apertures 24 and 26 which extend partially through the housing segments 20 and 22 respectively. Additionally, an annular valve seat 38 is formed adjacent one end of the housing segment 22 and around the enlarged aperture 26. The valve seat 38 is formed as a sharp, circular ridge which faces the housing segment 20. An enlarged annular cavity 37 is formed within the flange 50 at the face of the housing segment 20, and provides a valve housing between the annular valve seat 38 and a sealing surface 35 of the housing segment 20.

Figure 5:
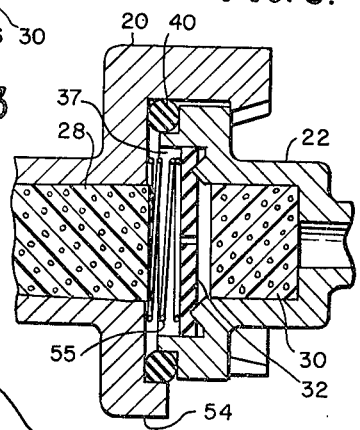
FIG. 5 is an enlarged partial cross-sectional view showing the internal components of the time delay valve with the spring inserted into the enlarged cavity.

Disposed within cavity 37 is a resilient valve disk 33 and either a selectively insertable, annular spacer ring 36 (as shown in FIG. 2) or a small compression spring 55 (as shown in FIG. 5). The valve disk 33 has a small orifice 34 therethrough and cooperates with the valve seat 38. The selectively insertable spacer ring 36 or small compression spring 55 may be positioned between the seal surface 35 and the valve disk 33 (as shown in FIGS. 2 and 5 respectively) to maintain or bias the valve disk 33 against the valve seat 38.

Surrounding the cavity 37 and positioned between the housing segments 20 and 22 is an O-ring 40 which resiliently seals the two housing segments 20 and 22 together. An annular recess 52 formed at the outer edge of the flange 50 serves as a seat for the O-ring 40, as does a raised annular ridge 54 which extends between the flanges 42 on the housing segment 22. Filter material, such as cellulose, 28 and 30 is provided in the enlarged apertures 24 and 26, respectively, to prevent dirt particles from entering the cavity region 37. As can be readily understood, the use of a resilient valve disk insures proper seating of the disk 33 on the valve seat 38 and provides flexibility to aid in the dislodging of any dirt particles that might accumulate around the flow orifice 34.

The operation of the time delay valve in the system of FIG. 1 (i.e., disposed between the vacuum advance port 6 and the spark distributor servo mechanism 10, for example), can now be described. In FIG. 1, it can be seen that the location of the vacuum advance port 6 at the off-idle position results in the throttle valve 8, at idle, being closed downstream of the port 6. Thus, when the vehicle accelerator (not shown) is not depressed, the vacuum advance spark port 6 is at atmospheric pressure. In this mode, when pressures within the system have equalized, the spark advance servo mechanism 10 and both apertures 24 and 26 of the time delay valve 21 will be at atmospheric pressure. Additionally, due to the servo mechanism 10 being at atmospheric pressure, the spark distributor breaker plate (not shown) is maintained in its retard or lowest timing advance setting.

When gradual acceleration is initiated, by partial depression of the vehicle accelerator (not shown), the throttle valve 8 rotates in a clockwise direction, as viewed in FIG. 1, and partially shields the vacuum advance port 6 from atmospheric pressure, thereby exposing the port 6 to the vacuum maintained in the intake manifold 4 of the engine. The vacuum is quickly communicated through conduit 14 to the enlarged aperture 26 of the time delay valve 21. Since the spacer ring 36 holds the resilient disk 33 against the annular valve seat 38, equilization of the pressure across the valve is accomplished entirely through the flow orifice 34. Due to the small size of the orifice 34, equalization of the pressure across the valve is delayed, resulting in a gradual increase in vacuum at the servo mechanism 10 and a gradual increase in the spark advance timing setting of the breaker plate. This regulated or delayed increase in the spark advance timing setting during gradual acceleration lowers the combustion temperatures of the engine and significantly reduces exhaust pollutants.

If the engine is subjected to rapid acceleration conditions, the throttle valve 8 rotates clockwise to a substantially open position. This results in higher pressures (i.e., lower vacuum) at the port 6, and a rapid decay of vacuum in the intake manifold 4. Therefore, due to the previously attained vacuum level in aperture 24 and the servo mechanism 10 a pressure differential occurs across the valve 21. However, because the spacer ring 36 holds the valve disk 33 against the valve seat 38, equalization of pressure is again regulated or delayed by the flow orifice 34. This regulation causes a slow decrease in vacuum at the spark servo mechanism 10, and results in a slow or gradual retard of the distributor spark advance timing setting. Such a gradual decline in engine timing during full acceleration conditions (in combination with carburetor air-fuel enrichment) has been found to increase the performance and reduce pollutants in engine exhaust emissions.

Additionally, after the initial rapid decay of vacuum encountered during full acceleration conditions, continued partial acceleration produces a gradual increase in vacuum at the intake manifold 4. This increase in vacuum is communicated to vacuum advance port 6 and is regulated by the flow orifice 34, thereby causing a slow increase in the distributor advance timing setting which is conducive to increased performance and reduced exhaust pollutants.

It therefore can be easily recognized that the present invention provides an easily installed and economical time delay valve which, when disposed in a vacuum line between a carburetor vacuum advance port 6 and a distributor advance servo mechanism 10, continuously regulates the rate of change of vacuum, thereby significantly reducing exhaust pollutants with minimal adverse effects upon engine performance.

Figure 4:
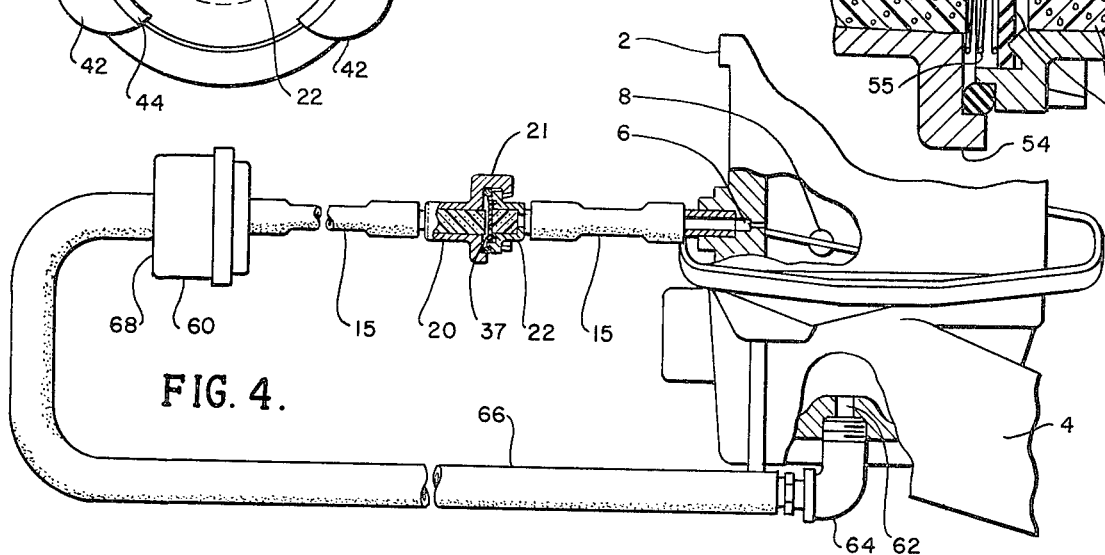
FIG. 4 is a schematic view showing the time delay valve installed in a vacuum line between a carburetor vacuum advance port and an intake manifold air bleed device.

An alternative use of a modified time delay valve 21 is shown in FIG. 4. In this modification, the time delay valve 21 is connected in series (for example) with a vacuum conduit 15 between the carburetor vacuum advance port 6 and a modulating air bleed device 60. Such a modulating air bleed device 60 is well known in the art and is disclosed in U.S. Pat. No. 3,913,541 issued to Scott Jr. on Oct. 21, 1975, the description thereof incorporated herein by reference.

In this modification, the intake manifold 4 has an intake vacuum port 62 onto which an elbow 64 is attached. The modulating air bleed device 60 is in communication with the intake vacuum port 62 through a conduit 66. Additionally, the modulating air bleeder 60 communicates with the vacuum advance port 6 through the conduit 15. Although the air bleed 60 is connected to both the intake manifold 4 through the conduit 60, and the vacuum advance port 6 through the conduit 15, the internal configuration of the air bleeder 60 is such that the conduits 60 and 14 are isolated and are never in direct flow communication. Rather, the vacuum level in conduit 15 controls the admission of ambient air into the conduit 66 at the modulating air bleed device 60.

Disposed in series with the conduits 15 is the time delay device 21 of the present invention. In this embodiment, however, the spacer ring 36 (shown in FIG. 2) is removed and replaced with a spring 55 (as shown in FIG. 5) which is inserted into the enlarged cavity 37 formed between the two housing segments 20 and 22.

Basically, the function of the modulating air bleed device 60 is to supply ambient air to the intake manifold 4 in differing quantities during engine operation. Two types of such air bleed devices are currently used in the industry, single channel and dual channel systems. In the dual channel devices, one channel continuously introduces a uniform quantity of air into the intake manifold 4 during engine idle conditions, and a second channel periodically introduces an additional quantity of air into the intake manifold 4 as a function of engine vacuum. Alternatively, in the single channel devices, additional air is only introduced into the intake manifold 4 during partial acceleration and deceleration conditions. It is well known in the art that such bleeding of air into the intake manifold as a function of engine vacuum reduces exhaust emission pollutants. Further, the applicant has discovered that, by regulating the rate of change of vacuum transferred between the air bleed device and the carburetor vacuum advance port, exhaust emissions can be reduced even further in some vehicles.

The operation of the time delay valve of FIG. 4 (i.e., disposed in the vacuum line 15 between the carburetor vacuum advance port 6 and a dual channel modulating air bleed 60, for example) may now be described. When the engine is idling, the throttle valve 8 is positioned downstream of the spark port 6 and the vacuum advance port 6, conduit 15 and the time delay valve 21 will, with time, reach atmospheric pressure. During this same idling condition, air is continuously introduced into one channel of the modulating air bleed 60 through the annular baffle surface 68 and bleed into the intake manifold 4 through conduit 66 and the intake vacuum port 62. Alternatively, if a single channel air bleed device is used, no air will be introduced into the intake manifold 4 through conduit 66 during this idling condition.

When gradual acceleration of the vehicle is initiated, the throttle valve 8 rotates clockwise to a position above the spark port 6, thereby causing a vacuum at the vacuum advance port 6. In turn, this vacuum is quickly communicated to the time delay valve 21 through conduit 15. In this embodiment, since the spacer ring 36 is removed from the valve 21 and replaced by the spring 55 (as shown in FIG. 5), the resilient disk 33 is not continuously maintained against the valve seat 38, but rather is free to move against the spring 55 within the cavity 37. However, the application of vacuum at the spark port 6 quickly causes the resilient disk 33 to seat against the valve seat 38, and the equalization of pressure across the valve must be obtained through the flow orifice 34. The flow orifice 34 delays or regulates the rate of change of vacuum, so that only a slow change in vacuum will be transmitted to the air bleed device 60.

The dual channel air bleed device 60, upon sensing this increase in vacuum, opens a secondary channel (or simply opens if a single channel air bleeder is utilized) and bleeds additional air into the intake manifold 4 through conduit 66. However, due to the time delay valve 21 regulating the application of vacuum to the air bleed 60, the quantity of excess air introduced into the intake manifold 4 will increase more slowly than the rate of any given increase in vacuum at the vacuum advance port 6. It has been discovered that this slow increase in excess air introduced into the intake manifold during gradual acceleration conditions significantly reduces exhaust emissions without serious adverse effects upon engine performance or vehicle driveability.

During rapid acceleration conditions, the throttle valve 8 rotates to a substantially open position, and a rapid decay in vacuum develops at the spark port 6. Due to the previous value of vacuum obtained during gradual acceleration, a pressure differential exists across the valve. This pressure differential, i.e., vacuum at the air bleeder 60 and atmospheric pressure at the spark port 6, quickly causes the resilient disk 33 to unseat itself from the valve seat 38 by overcoming the slight biasing force of the spring 55 and move into the enlarged cavity 37. The disk 33 cannot seat against the opposite side of the cavity 37, because it is supported away from the cavity by the biasing force of spring 55. Upon moving away from the valve seat 38, equalization of pressure is quickly accomplished by flow around the valve disk 33 and through the enlarged cavity 37. This quick equalization of pressure allows the air bleed device 60 to rapidly discontinue the introduction of additional air into the intake manifold. Such rapid discontinuance of additional air into the intake manifold 4 during full acceleration conditions is conducive to increased engine performance and decreased exhaust pollutants. Similarly, once the equalization of pressure across the valve has occurred, any increase in vacuum developed at the spark port 6 will cause the valve disk 33 to seat against the valve seat 38 and delay the rate of change of vacuum transmitted to the air bleed device 60.

Although the time delay valve 21 of the present invention has been disclosed in two preferred vacuum systems, the utility of the valve is not limited to these applications exclusively.

The applicant has discovered that the valve 21 is suitable for use in a variety of engine vacuum applications where a time delay between a vacuum source and a vacuum actuated device is desired. Additionally, the versatility of the valve may be increased by simply enlarging or reducing the size of the flow orifice 34, to adapt the valve to the particular vacuum applications.

What is claimed is:

1. A vacuum control system for reducing exhaust pollutants in an internal combustion engine, comprising:
    an intake manifold maintained under partial vacuum by said engine;
    a carburetor in communication with said intake manifold including a throttle valve pivotally mounted therein;
    a vacuum advance port located adjacent said throttle valve providing a variable vacuum signal as a function of engine performance conditions;
    a vacuum modulated air bleed means connected between said vacuum advance port and said intake manifold to selectively increase or decrease the amount of ambient air introduced into said intake manifold in response to said variable vacuum signal; and
    means connected between said vacuum modulated air bleed means and said vacuum advance port for controlling the vacuum change rate of said variable vacuum signal from said vacuum advance port to said air bleed means, said means delaying an increase in said vacuum signal encountered during moderate acceleration engine operating conditions to slowly increase the amount of ambient air introduced into said intake manifold, and rapidly communicating a decrease in said vacuum signal encountered during high acceleration engine operating conditions to rapidly decrease the amount of ambient air introduced into said intake manifold.

2. The control system of claim 1 wherein said vacuum change rate controlling means comprises:
    a valve formed of a first and second housing segment having an aperture therethrough defining an annular seat;
    said first housing segment having a plurality of radially extending flexible flanges positioned around its outside diameter;
    said second housing segment having an outside diameter to engage said flanges;
    said flanges locking said first and said second housing segments together;
    an elastomeric disk with an orifice therethrough cooperating with said annular seat; and
    a compression spring biasing said disk against said seat, said orifice means providing a time delay in said increase in said vacuum signal encountered during moderate acceleration engine operating condition.

3. The control system of claim 2 wherein an O-ring is disposed between said first and said second housing segments to seal said housing segments together.

4. The control system of claim 1 wherein said valve body additionally comprises enlarged apertures extending on both sides of said elastomeric disk, said enlarged aperatures housing filter material.

5. The control system of claim 4 wherein said filter material is cellulose.

6. In an internal combustion engine comprising an intake manifold maintained at partial vacuum, a carburetor having a vacuum advance port providing a variable vacuum signal as a function of engine performance conditions, a vacuum modulated air bleed device connected between said vacuum advance port and said intake manifold to selectively increase or decrease the amount of ambient air introduced into said manifold in response to said variable vacuum signal, an improved method of reducing exhaust pollutants from said engine comprising the steps of:
    delaying an increase in said vacuum signal during moderate acceleration engine performance conditions to slowly increase the amount of said ambient air introduced into said intake manifold; and
    rapidly communicating a decrease in said vacuum signal during high acceleration engine performance conditions to rapidly decrease the amount of ambient air introduced into said intake manifold.

* * * * *